United States Patent [19]
Noji

[11] Patent Number: 5,694,169
[45] Date of Patent: Dec. 2, 1997

[54] WATERPROOF CASE FOR A CAMERA

[75] Inventor: Minoru Noji, Kanagawa-ken, Japan

[73] Assignee: Canon Kabushiki Kaisha, Tokyo, Japan

[21] Appl. No.: 787,257

[22] Filed: Jan. 24, 1997

Related U.S. Application Data

[63] Continuation of Ser. No. 339,574, Nov. 14, 1994, abandoned, which is a continuation of Ser. No. 94,613, Jul. 19, 1993, abandoned.

[30] Foreign Application Priority Data

Jul. 31, 1992 [JP] Japan ................. 4-205103

[51] Int. Cl.⁶ ............ H04N 5/225; H04N 5/222; H04N 7/18; H04N 9/47
[52] U.S. Cl. ............ 348/373; 348/81; 348/333; 396/25; 396/27
[58] Field of Search ............ 348/207, 211, 348/81, 373, 374, 333; 396/25, 27, 373

[56] References Cited

U.S. PATENT DOCUMENTS

| | | | |
|---|---|---|---|
| 5,162,915 | 11/1992 | Idera et al. | 358/224 |
| 5,239,323 | 8/1993 | Johnson | 354/64 |
| 5,294,988 | 3/1994 | Wakabayashi et al. | 348/373 |
| 5,303,050 | 4/1994 | Nishimura et al. | 348/211 |
| 5,412,425 | 5/1995 | Nagano | 348/333 |
| 5,506,620 | 4/1996 | Ozawa | 348/333 |

FOREIGN PATENT DOCUMENTS

| | | | |
|---|---|---|---|
| 55-11235 | 7/1980 | Japan | G03B 17/08 |
| 3239239 | 10/1991 | Japan | G03B 17/08 |
| 452630 | 2/1992 | Japan | G03B 17/08 |
| 4235540 | 8/1992 | Japan | G03B 17/08 |
| 2255648A | 11/1992 | United Kingdom | G03B 17/08 |

*Primary Examiner*—Leo Boudreau
*Assistant Examiner*—Bipin Shalwala
*Attorney, Agent, or Firm*—Robin, Blecker, Daley & Driscoll

[57] ABSTRACT

A video camera system includes a video camera, a waterproof case for containing the video camera, a detecting part for detecting a water leak into the case, and a display part for displaying warning of the water leak according to an output of the detecting part. Further, a waterproof case includes a waterproof case part capable of removably containing a camera, a detecting part for detecting a water leak into the case part, and a transmission part for transmitting an output of the detecting part to the camera.

18 Claims, 4 Drawing Sheets

WATERPROOF CASE FOR A CAMERA

This is a continuation application under 37 CFR 1.62 of prior application Ser. No. 08/339,574, filed Nov. 14, 1994 now abandoned, which is a continuation of Ser. No. 08/094,613, filed Jul. 19, 1993, abandoned.

BACKGROUND OF THE INVENTION

1. Field of the Invention

This invention relates to a waterproof case for a camera and, more particularly, to a waterproof case having a waterproof structure adapted to contain a camera so as to enable the camera to perform underwater photography.

2. Description of the Related Art

Some of the conventional waterproof cases (hereinafter referred to as waterproof packs) arranged to contain video cameras so as to enable the video cameras to perform underwater shooting are provided with an optical window which is made of a transparent or semitransparent acrylic resin material and arranged as a means for giving warning of a water leak into the waterproof pack (hereinafter referred to as a warning window). The warning window is airtightly formed at one corner on the bottom side of the waterproof pack in such a way as to completely shut off the inside of the waterproof pack from the outside.

The warning window is located in the lowest part of the conventional waterproof pack. On the contrary, the operator of the camera generally performs shooting while viewing an electronic viewfinder which is located at an upper part or one side part of the waterproof pack and not at the bottom thereof. Therefore, in the event of occurrence of a water leak, the warning made at the warning window tends to fail to attract the attention of the camera operator to the warning.

SUMMARY OF THE INVENTION

The present invention is directed to the solution of the problem mentioned in the foregoing. It is, therefore, an object of the invention to provide a video camera system having a waterproof case which is arranged to reliably allow the operator of the video camera to readily know occurrence of a water leak into the waterproof case even in process of shooting.

To attain this object, a video camera system arranged as one preferred embodiment of the invention comprises a video camera, a case having a waterproof structure for containing the video camera, a detecting part for detecting a water leak into the case, and a display part for displaying warning of the water leak according to an output of the detecting part.

A waterproof case for a camera arranged as another preferred embodiment of the invention comprises a case part having a waterproof structure capable of removably containing the camera, a detecting part for detecting a water leak into the case part, and a transmission part for transmitting an output of the detecting part to the camera.

Other objects and advantages of the invention will become apparent from the following detailed description taken in conjunction with the appended claims.

DETAILED DESCRIPTION OF THE PREFERRED EMBODIMENTS

Figure 1:
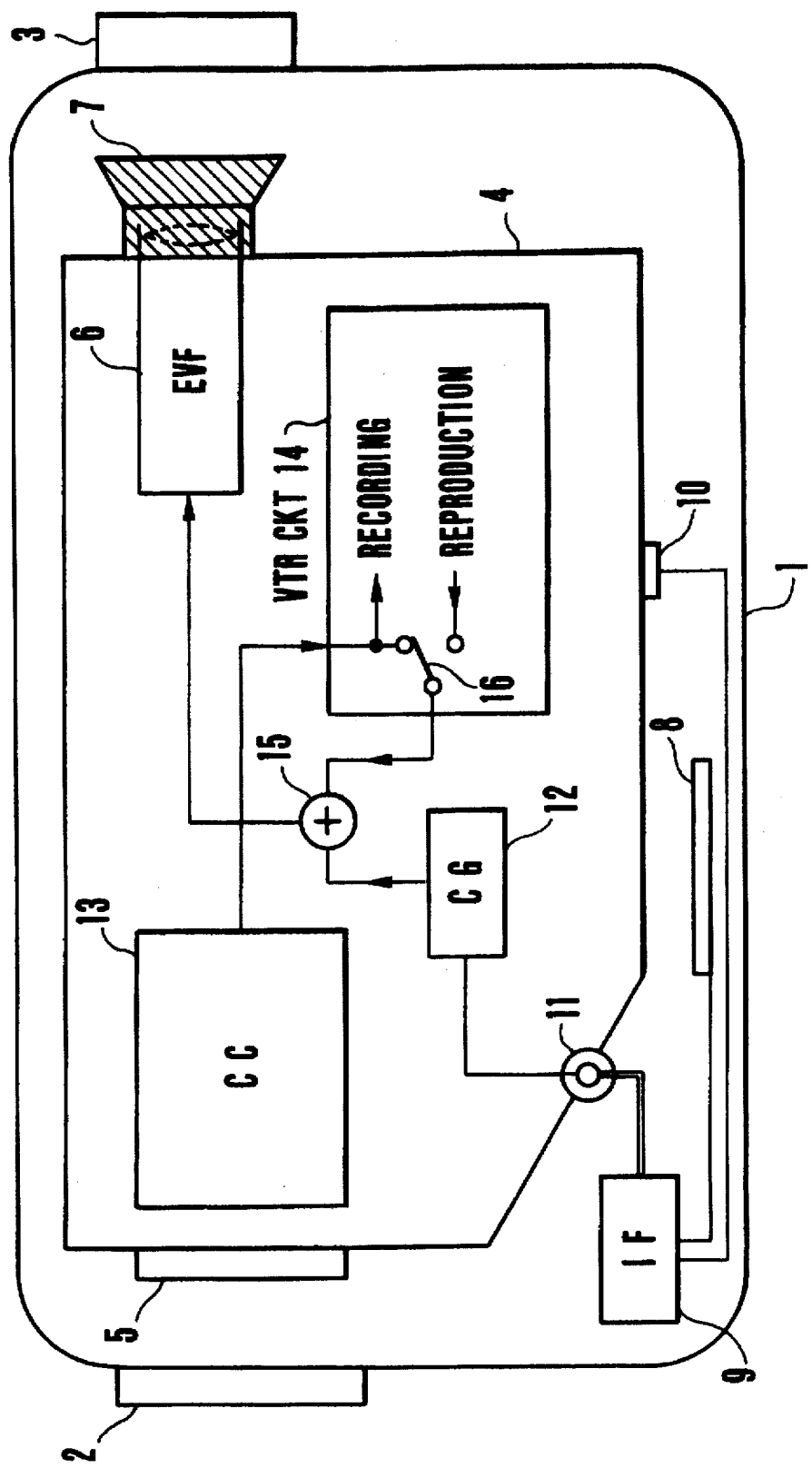
FIG. 1 is a schematic view showing the internal arrangement of a video camera system which is an embodiment of the invention and includes a video camera and a waterproof pack containing the video camera.

A first embodiment of the invention is described as follows. FIG. 1 schematically shows the internal arrangement of the first embodiment which includes a camera-integrated type VTR 4 and a waterproof pack (or case) 1 which contains the camera-integrated type VTR 4.

Referring to FIG. 1, the waterproof pack 1 has a shooting window 2 which is made of a transparent plastic material or the like and disposed on the front side of the waterproof pack 1 and a viewing window 3 which is also made of a transparent material or the like and disposed on the rear side of the waterproof pack 1.

The camera-integrated type VTR 4 which is stowable in the waterproof pack 1 has a camera lens light receiving part 5 arranged to be coaxial with the shooting window 2, a circuit block 6 for an electronic viewfinder part (hereinafter referred to as EVF) disposed behind the camera lens light receiving part 5, and an optical lens system 7 arranged to be coaxial with the viewing window 3 and to optically enlarge the image of an electronic viewfinder image plane.

A water leak sensor 8 arranged to electrically detect a water leak into the waterproof pack 1 is attached to the inside bottom surface of the waterproof pack 1. An interface circuit (IF) 9 arranged to electrically convert a detection signal of the water leak sensor 8 to a given level and to supply the signal to the camera-integrated type VTR 4 is disposed, for example, in a lower part within the waterproof pack 1. A switch 10 is arranged to turn on when the camera-integrated type VTR 4 is set in place within the waterproof pack 1. The interface circuit 9 becomes drivable when this switch 10 turns on.

A connector 11 arranged to connect a water leak signal of the interface circuit 9 to the inside of the camera-integrated type VTR 4 is disposed on a side wall of the camera-integrated type VTR 4.

In addition to the EVF 6, the following parts are disposed within the camera-integrated type VTR 4. A character generating circuit (CG) 12 is arranged to generate a character signal such as a warning message or a warning pattern image corresponding to the water leak signal. A camera circuit (CC) 13 is arranged to convert an object image coming through the lens light receiving part 5 into an electrical video signal by using an image sensor such as a CCD or the like. A VTR circuit 14 is arranged to record or reproduce the video signal. A combining circuit 15 is arranged to combine the video signal outputted from the VTR circuit 14 with the character signal outputted from the character generating circuit 12 and to supply a composite signal thus obtained to the EVF 6. A change-over switch 16 is arranged within the VTR circuit 14 to selectively supply the video signal from the camera circuit 13 or a reproduced video signal from the VTR circuit 14 to the combining circuit 15. The camera circuit 13 includes an image pickup circuit and a signal processing circuit which is arranged to operate in a known manner.

According to the first embodiment, when the camera-integrated type VTR 4 is contained within the waterproof pack 1 as shown in FIG. 1, if something happens to cause a water leak into the waterproof pack 1 during the process of shooting under water, a warning action is performed in the following manner.

Figure 2:
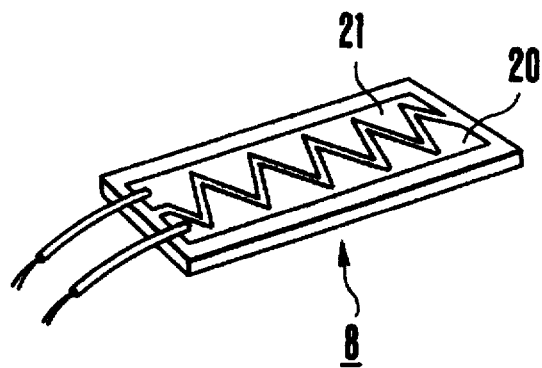
FIG. 2 is an oblique view showing by way of example the arrangement of a water leak sensor included in the embodiment shown in FIG. 1.
Figure 3:
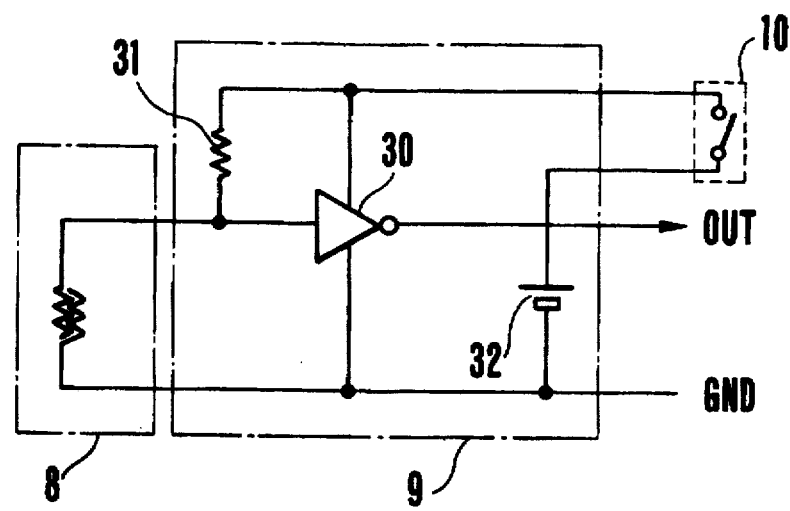
FIG. 3 is a circuit diagram showing by way of example the arrangement of an interface circuit included in the embodiment shown in FIG. 1.

Referring to FIG. 2, the water leak sensor 8 is formed, for example, by setting two electrodes 20 and 21 on an insulated base. When the leaking water comes to stick to the sensor 8 between the two electrodes 20 and 21, the resistance value between the electrodes 20 and 21 becomes lower as water generally includes a slight amount of impurities therein. The interface circuit 9 then converts the resistance value between the electrodes 20 and 21, for example, into a logic signal at the level of a TTL logic element of a 5 V type. This logic signal is supplied to the character generating circuit 12 through the connector 11. FIG. 3 shows by way of example the arrangement of the interface circuit 9.

Referring to FIG. 3, the interface circuit 9 includes a CMOS inverter circuit 30, a pull-up resistor 31 and a battery 32. The switch 10 is closed when the camera-integrated type VTR 4 is set in a given position. If no water drop is sticking to the water leak sensor 8, the electric resistance of the sensor 8 is extremely high. Then, since the input side of the CMOS inverter circuit 30 is connected to a plus potential part of a battery 32 via the pull-up resistor 31, the output of the CMOS inverter circuit 30 is at a low level in logic value. If water sticks to the water leak sensor 8, the resistance value of the sensor 8 becomes lower as mentioned above. With the resistance value of the pull-up resistor 31 preset at an adequate value (a threshold level), the output level of the inverter circuit 30 becomes a high level in logic value as the input voltage of the inverter circuit 30 becomes lower than the threshold level. As mentioned above, when water leaks into the waterproof pack 1, a signal of a high level is supplied from the interface circuit 9 to the character generating circuit 12 of the camera-integrated type VTR 4 via the connector 11.

In response to the high-level signal inputted via the connector 11, the character generating circuit 12 generates a character signal indicative of a water leak warning message in synchronism with a synchronizing signal of the video signal outputted from the camera circuit 13 of the camera-integrated type VTR 4.

Figure 4:
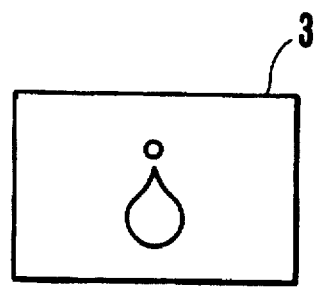
FIG. 4 shows one example of a water leak warning display to be made on an electronic viewfinder included in the embodiment shown in FIG. 1.
Figure 5:
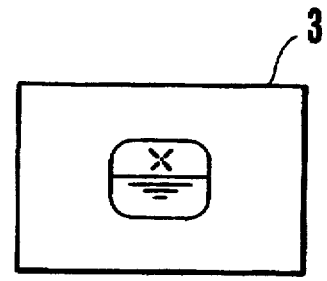
FIG. 5 shows another example of the water leak warning display to be made on the electronic viewfinder.

Meanwhile, within the VTR circuit 14, a video signal outputted from the camera circuit 13 or a video signal reproduced from the video tape is selected by the change-over switch 16. The character signal indicative of the water leak warning character coming from the character generating circuit 12 is combined with the shooting video signal or the reproduced video signal. A composite signal thus obtained is sent to the EVF 6 to have a given water leak warning displayed on the image plane of the EVF 6. FIGS. 4 and 5 respectively show examples of a warning display picture to be thus displayed on the EVF 6.

This warning display picture is displayed on the basis of character (pattern) data stored beforehand in a memory, such as a ROM or a nonvolatile RAM, which is included in the character generating circuit 12. The warning display picture to be displayed on the EVF 6 is not limited to such pictures as those shown in FIGS. 4 and 5. The warning display picture also may be replaced with a warning display of some suitable characters indicating "water leak".

It goes without saying that the character display function of the embodiment enables the camera-integrated type VTR 4 to simultaneously or selectively display various kinds of information, such as its operation mode, other warnings, date, time, and title, on the EVF 6.

The water leak sensor 8 is not limited to the kind shown in FIG. 2 but may be selected from among other kinds as long as they are capable of detecting water.

The CMOS inverter circuit 30 of the interface circuit 9 shown in FIG. 3 may be replaced, for example, with an amplifying element such as a transistor or the like. In that case, the logic value and the signal level of course can be set as desired. The battery 32 may be of such a type that can be charged by receiving electric power from the camera-integrated type VTR 4.

As described above, the first embodiment is arranged to detect a water leak into the waterproof pack and to display warning of the water leak on the image plane of the electronic viewfinder (EVF) of the video camera of the camera-integrated type VTR. This display enables without fail the camera operator to readily know of the water leak while viewing the electronic viewfinder.

A second embodiment of the invention is described in detail as follows.

Figure 6:
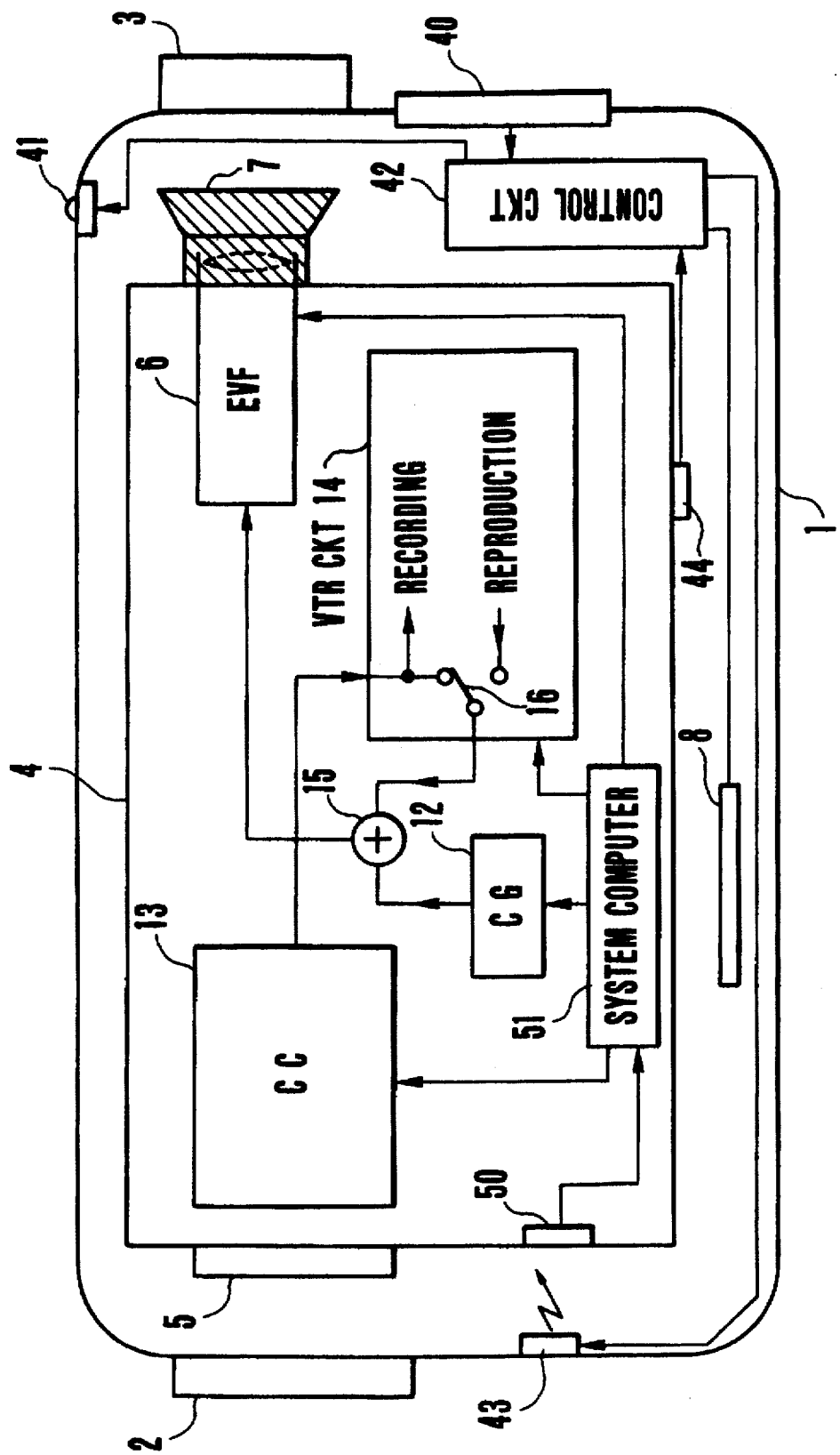
FIG. 6 is a schematic view showing the internal arrangement of a video camera system which is a second embodiment of the invention and includes a camera-integrated type VTR and a waterproof pack containing the camera-integrated type VTR.

FIG. 6 shows the internal arrangement of the second embodiment which includes a camera-integrated VTR 4 and a waterproof pack 1 which contains the camera-integrated type VTR 4. In FIG. 6, all parts corresponding to those shown in FIG. 1 are indicated by the same reference numerals, and the details of them are omitted from description.

An operation part 40 which is provided for instructing the camera-integrated type VTR 4 to perform various actions and a warning light emitting diode 41 which is provided for giving warning of a water leak are disposed on the outside of the waterproof pack 1. The operation part 40 is arranged not to admit water into the waterproof pack 1 when a switch of the operation part 40 is operated under water.

A control circuit 42 is arranged to cause an infrared ray emitting diode 43 to emit digitally coded infrared rays toward the camera-integrated type VTR 4 or to cause the warning light emitting diode 41 to emit light, according to the state of the operation part 40 and that of the water leak sensor 8. The control circuit 42 is provided with a secondary battery, which supplies electric power to various circuits arranged within the waterproof pack 1.

When the camera-integrated type VTR 4 is set in a predetermined position within the waterproof pack 1, the control circuit 42 is connected to the camera-integrated type VTR 4 by the connector 44. Electric power is supplied from the camera-integrated type VTR 4 via the connector 44 to the control circuit 42 to charge the secondary battery which is disposed within the control circuit 42.

The camera-integrated type VTR 4 is arranged to detect the above-stated digitally coded infrared rays by means of a photosensor 50. The photosensor 50 then outputs a detection signal. A system computer 51 is arranged to analyze the detection signal and to control applicable circuits according to the result of analysis.

Figure 7:
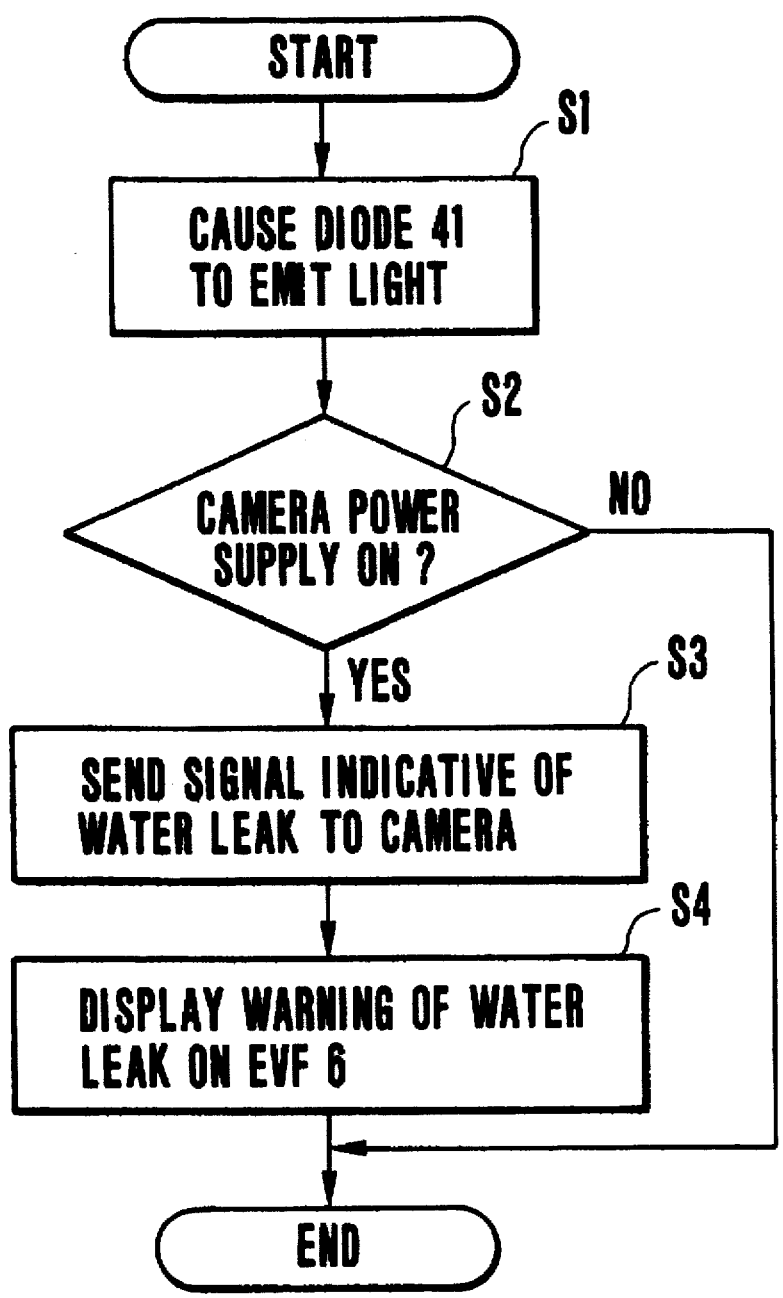
FIG. 7 is a flow chart showing a water leak warning action of the second embodiment of the invention.

In the second embodiment arranged as described above, when the camera-integrated type VTR 4 is contained within the waterproof pack 1 as shown in FIG. 6, if a water leak into the waterproof pack 1 occurs due to some cause while the camera is in process of shooting under water, the water leak warning action is performed as described below with reference to FIG. 7 which is a flow chart.

The flow of the water leak warning action begins when a water leak is detected by the water leak sensor 8. At a step S1, the warning light emitting diode 41 which is provided for indicating a water leak is caused to emit light. The flow then proceeds to a step S2. At the step S2, a check is made for the on-state of a power supply of the camera-integrated type VTR 4. This check is made by finding whether or not a power supply switch provided at the operation part 40 has been operated. In the case of this embodiment, data for the operation of the power supply switch is stored by the control circuit 42. If the power supply of the camera is found to be on, the flow comes to a step S3. If not, the flow comes to an end.

At the step S3, the digitally coded infrared rays indicative of a water leak are emitted from the infrared ray emitting diode 43 to the camera-integrated type VTR 4. At a step S4, the coded infrared rays coming from the infrared ray emitting diode 43 are detected by the photosensor 50. A detection signal thus obtained is analyzed by the system computer 51, so that the detection signal is determined to be a water leak signal. The character generating circuit 12 is controlled to make a water leak warning display on the image plane of the EVF 6 in the same manner as in the case of the first embodiment described in the foregoing. With the display made on the EVF 6, the flow comes to an end.

Electric energy can be saved in accordance with the arrangement of the second embodiment described above.

This invention is applied to a camera-integrated type VTR in the case of each of the embodiments described. However, this invention is applicable also to a case where a camera or a VTR is singly set within a waterproof pack.

The second embodiment is arranged to detect a water leak into the waterproof pack and to make a water leak warning display on the image plane of the electronic viewfinder as mentioned above. The arrangement enables the camera operator to readily and accurately know the water leak while the operator is viewing the electronic viewfinder. Further, since the light emitting diode is arranged to give warning of the water leak, the water leak can be readily found by the operator even when the camera is not used.

While preferred embodiments have been described, the invention is not limited to these embodiments. The invention may be embodied in other various forms without departing from the spirit and the essential features of the invention.

In other words, the foregoing description of embodiments has been given for illustrative purposes only and is not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. A video camera system for taking pictures by using a video camera unit provided with display means for displaying taken pictures, and a container unit, having a waterproof structure detachably containing said video camera unit, wherein said video camera unit is capable of using in the state that said video camera unit is detached from said container unit, a) said container unit comprising:
 first detecting means for detecting that said video camera is set in a predetermined place in the container unit;
 second detecting means provided inside the container unit for detecting a water leak into said container unit;
 connecting means for connecting said second detecting means and said video camera unit detachably;
 transmission means for transmitting an output of said second detecting means to said video camera unit in the state that said video camera unit is contained in said container unit and connected by said connecting means in accordance with an output of said first detecting means; and b) said video camera comprising:
 warning means for displaying warning of the water leak into said container unit on said display means of said video camera unit according to the output of said second detecting means transmitted from said transmission means.

2. A system according to claim 1, wherein said video camera unit has a remote control function, and wherein said transmission means is arranged to send the output of said second detecting means in a wireless manner.

3. A system according to claim 1, wherein electric power for said second detecting means is obtained by utilizing a power source arranged in said video camera unit.

4. A system according to claim 1, wherein said container unit further comprises instruction means for instructing said video camera unit to perform an action, and wherein information on the action instructed by said instruction means is transmitted to said video camera unit by using said transmission means.

5. A container case for a camera, comprising:
a) a case part having a waterproof structure detachably containing said camera;
b) first detecting means for detecting that said camera is set in a predetermined place in the container case;
c) second detecting means provided inside the case for detecting a water leak into said case part;
d) connecting means for connecting said second detecting means and said camera detachably; and
e) transmission means for transmitting an output of said second detecting means to said camera in the state that said camera is contained in said container case and connected by said connecting means in accordance with an output of said first detecting means, wherein said camera is capable of using in the state that said camera is detached from said container unit.

6. A container case according to claim 5, wherein electric power for said second detecting means is obtained by utilizing a power source arranged in said camera in the state that said camera is contained in said container case.

7. A container case according to claim 5, further comprising instruction means for instructing, by utilizing said transmission means, said camera to perform an action.

8. A container case according to claim 7, further comprising warning display means for displaying warning of the water leak according to the output of said second detecting means.

9. A container case according to claim 8, wherein said transmission means is arranged to transmit the output of said second detecting means in the state that said camera is operational.

10. A video camera system, comprising:
a) a video camera;
b) a case having a waterproof structure for containing said video camera detachably;
c) first detecting means for detecting that said video camera is set in a predetermined place in the case;
d) second detecting means arranged on an inside-wall of said case for detecting a water leak into said case and providing indication of detection of said water leak to said camera, said second detecting means being enabled in accordance with an output of said first detecting means; and
e) display means for displaying warning of the water leak according to an output of said second detecting means, wherein said video camera is capable of using in the state that said camera is detached from said container unit.

11. A video camera according to claim 10, wherein said display means is arranged to display a picture taken by said video camera.

12. A container case for an electronic apparatus, comprising:
a) a case part having a waterproof structure detachably containing said electronic apparatus;
b) first detecting means for detecting that said electronic apparatus is set in a predetermined place in the container case;
c) second detecting means for detecting a water leak into said case part;
d) connecting means for connecting said second detecting means and said electronic apparatus detachably; and
e) transmission means for transmitting an output of said second detecting means to said electronic apparatus in accordance with an output of said first detecting means, wherein said electronic apparatus is capable of using in the state that said electronic apparatus is detached from said case part.

13. A container case for an electronic apparatus, comprising:
a) a case part having a closed structure detachably containing said electronic apparatus;
b) first detecting means for detecting that said electronic apparatus is set in a predetermined place in the container case;
c) second detecting means provided inside the case for detecting an abnormality of said case part;
d) connecting means for connecting said second detecting means and said electronic apparatus detachably; and
e) transmission means for transmitting an output of said second detecting means to said electronic apparatus in accordance with an output of said first detecting means, wherein said electronic apparatus is capable of using in the state that said electronic apparatus is detached from said case part.

14. A container case according to claim 12, further comprising display means for displaying the output of said second detecting means.

15. An electronic apparatus detachable from a container case, comprising: warning means for warning an abnormality outside the electronic apparatus,
wherein said container case comprises
a case part having a closed structure containing detachably therein the electronic apparatus,
a first detection means for detecting that said electronic apparatus is set in a predetermined place in the container case,
a second detection means provided inside the case, for detecting the abnormality outside the electronic apparatus,
connecting means for connecting said second detection means and said electronic apparatus detachably, and
transmission means for transmitting an output of said second detection means to said electronic apparatus in the state that it is detected by said first detection means that the said electronic apparatus is set in a predetermined place, and wherein said electronic apparatus is capable of using in the state that said electronic apparatus is detached from said case part.

16. An apparatus according to claim 15, wherein said abnormality outside the electronic apparatus includes a water leak into said case part.

17. An abnormality detecting system, comprising:
a) an electronic apparatus;
b) a case having a closed structure for containing said electronic apparatus detachably;
c) first detecting means for detecting that said electronic apparatus is set in a predetermined place in the case;
d) second detecting means provided inside the case for detecting an abnormality of said case;
e) connecting means for connecting said second detecting means and said electronic apparatus detachably; and
f) transmission means for transmitting an output of said second detecting means to said electronic apparatus in accordance with an output of said first detecting means, wherein said electronic apparatus is capable of using in the state that said electronic apparatus is detached from said case.

18. A system according to claim 17, wherein said abnormality outside said case includes a water leak into said case.

* * * * *